(12) United States Patent
Kaszycki

(10) Patent No.: US 7,063,612 B2
(45) Date of Patent: Jun. 20, 2006

(54) AIR MIXING UNIT FOR A VENTILATION SYSTEM

(75) Inventor: Ivan J. Kaszycki, Azle, TX (US)

(73) Assignee: BEHR GmbH & Co. KG (DE)

( * ) Notice: Subject to any disclaimer, the term of this patent is extended or adjusted under 35 U.S.C. 154(b) by 61 days.

(21) Appl. No.: 10/768,212

(22) Filed: Jan. 30, 2004

(65) Prior Publication Data

US 2005/0170769 A1    Aug. 4, 2005

(51) Int. Cl.
 *B60S 1/58*    (2006.01)

(52) U.S. Cl. .................................. 454/121; 454/126
(58) Field of Classification Search .............. 454/49, 454/56, 57, 58, 59; 126/299 F, 299 R, 299 D
 See application file for complete search history.

(56) References Cited

U.S. PATENT DOCUMENTS

| | | | |
|---|---|---|---|
| 3,521,653 A | * | 7/1970 | Zoya et al. ................ 137/831 |
| 4,531,671 A | * | 7/1985 | Schwenk ................ 237/12.3 B |
| 4,852,638 A | * | 8/1989 | Hildebrand et al. ............ 165/42 |
| 4,972,992 A | * | 11/1990 | Scheidel et al. ........ 237/12.3 A |
| 6,308,770 B1 | * | 10/2001 | Shikata et al. ................ 165/42 |
| 6,881,140 B1 | * | 4/2005 | Le ................ 454/156 |
| 6,889,761 B1 | * | 5/2005 | Perry et al. ................ 165/202 |

* cited by examiner

*Primary Examiner*—Derek S. Boles
(74) *Attorney, Agent, or Firm*—Leydig, Voit & Mayer, Ltd.

(57) ABSTRACT

An air mixing unit for a ventilation system includes a housing with a control door to control at least one inlet air stream, a mode door to control at least one outlet air stream and air passages for supplying air through said mixing unit. An air duct system that is arranged to be attached to said control door funnels air from one side of said mixing unit to the other.

16 Claims, 8 Drawing Sheets

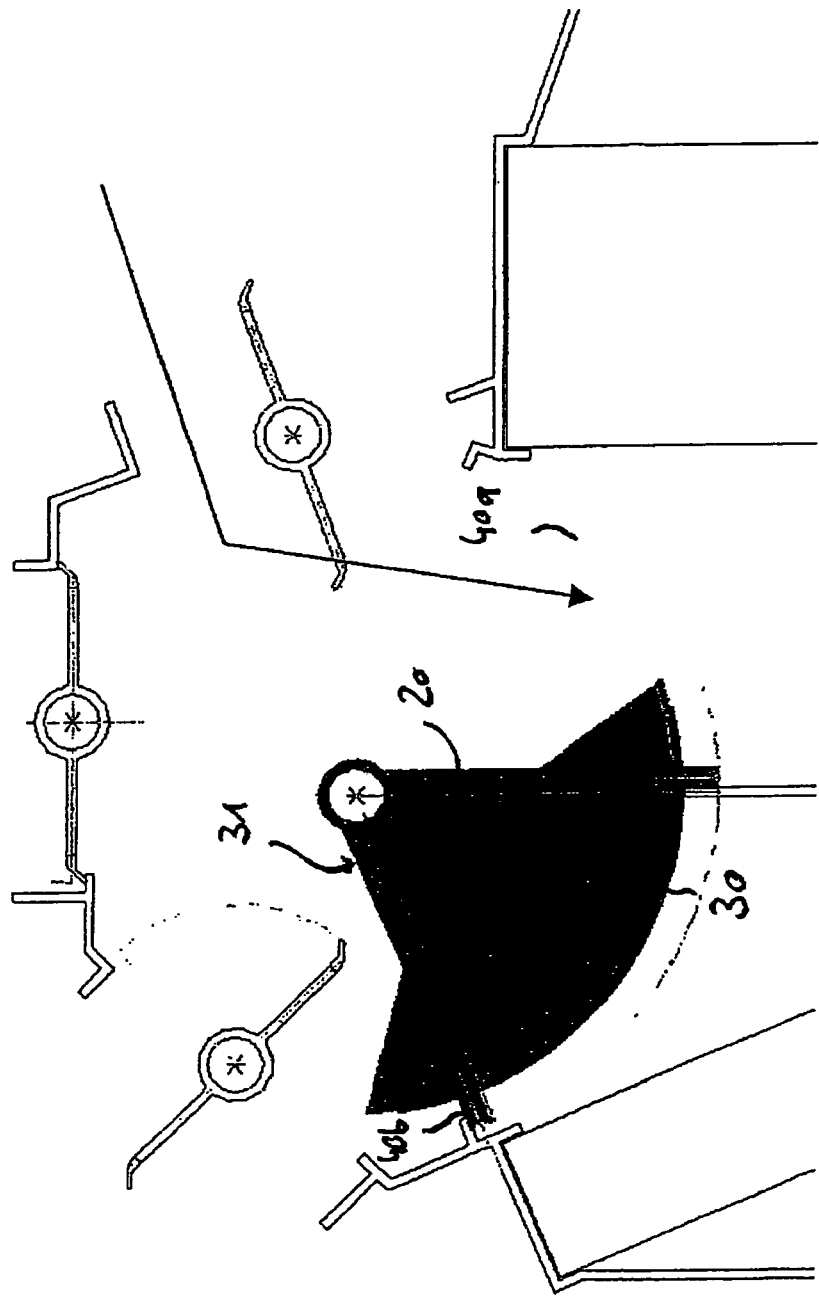

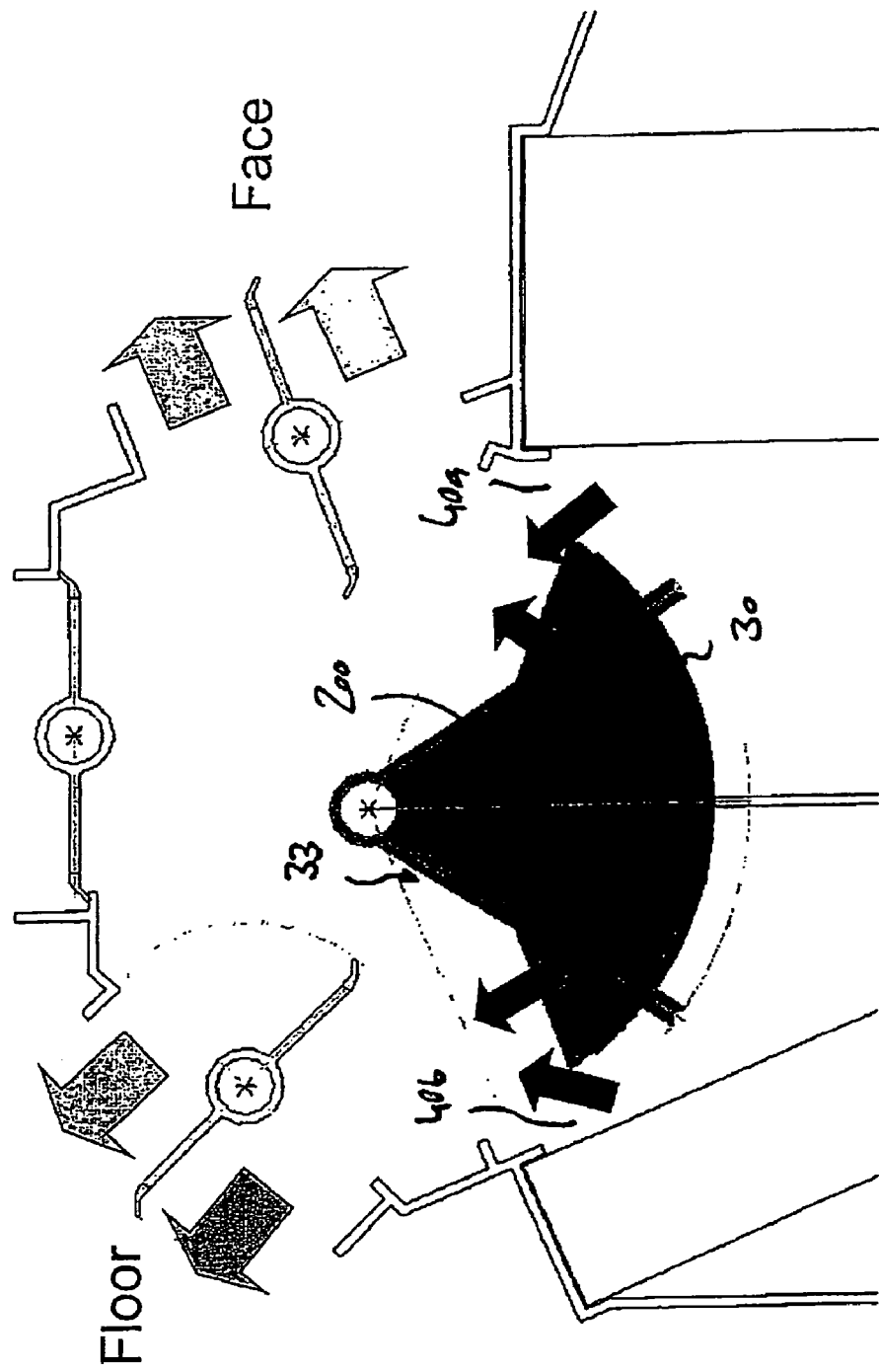

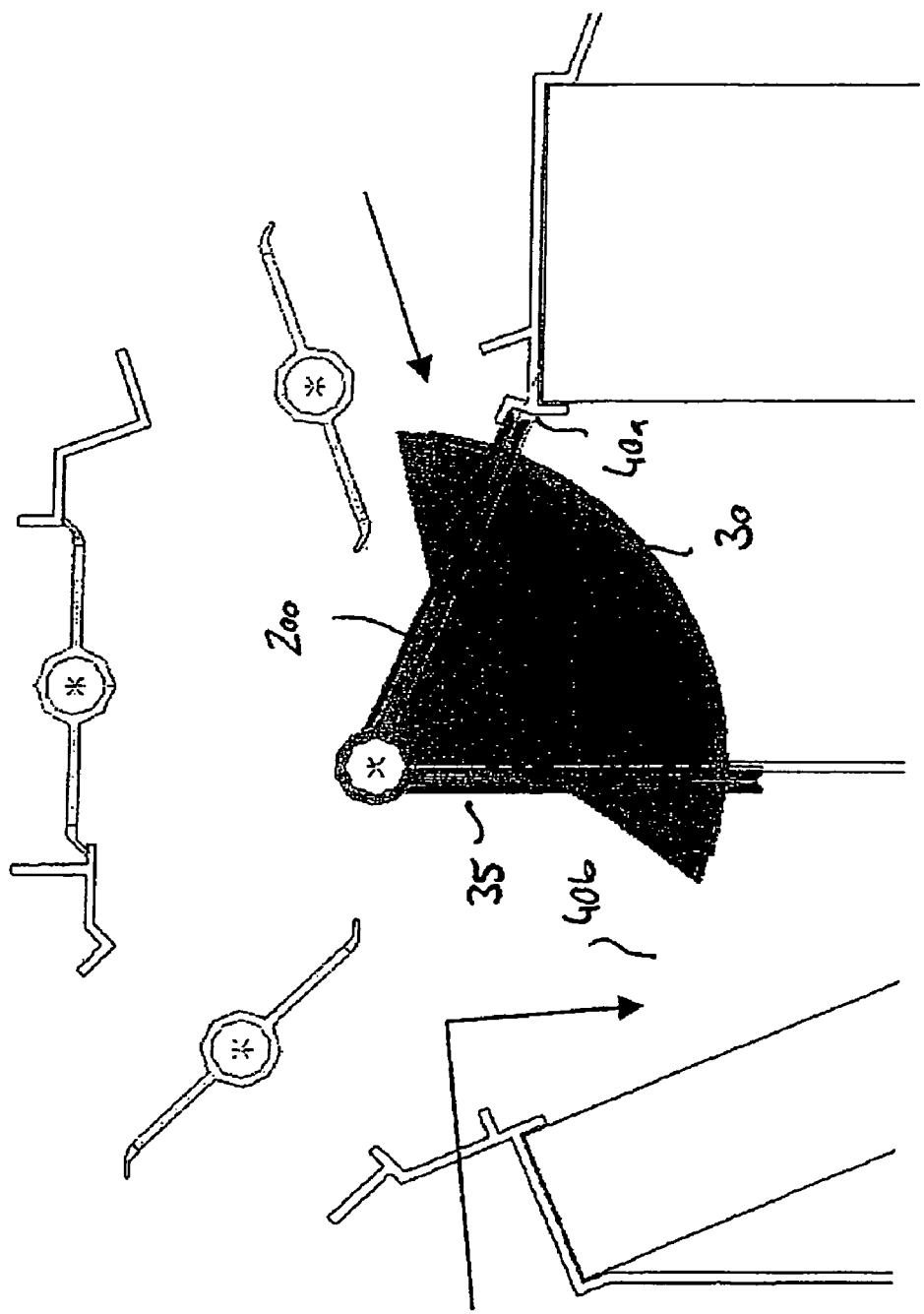

AIR MIXING UNIT FOR A VENTILATION SYSTEM

FIELD OF THE INVENTION

The present invention relates to an air mixing unit for a ventilation system, particularly to an air mixing unit comprising a housing with a control door to control at least one inlet air stream, a mode door to control at least one outlet air stream and air passages for supplying air through said mixing unit.

Conventional air conditioners include air mixing units that are arranged downstream from an evaporator and a heater. These mixing units typically comprise first inlet openings for a cold air stream, which has passed through an evaporator, and second inlet openings for a hot air stream, which has passed through a heater. Movable control doors are arranged at the inlet openings to control the entering of cold and hot air streams and to regulate a mixing ratio of the inlet air streams. Movable mode doors are arranged at outlet openings to control the exhausting of a mixture of hot and cold air and to distribute the mixture of hot and cold air exiting the unit in various modes adjustable by an user.

Inside the mixing unit, doors, flaps, baffles and parallel layered panels provide air passages for supplying air through the air mixing unit. The cold and hot air streams are canalized and divided in layered substreams by passing through the doors, flaps, baffles and panels to promote mixing.

It is known that mixing efficiency between the hot and cold air flows can be enhanced by using additional doors, flaps, baffles or air panels arranged inside the air mixing unit. The arrangement of yet additional equipment inside the mixing unit, however, results in bigger housings, a more complicated manufacture, and increased maintenance and manufacturing costs. In addition, additional mixing equipment decreases the overall efficiency of a mixing unit because, among other things, it blocks air streams through the air mixing unit when mixing is not required.

SUMMARY OF THE INVENTION

The present invention provides an efficient ventilation system air mixing unit with a compact housing that can be manufactured with reduced costs. According to a preferred embodiment of the present invention, the air mixing unit comprises a housing with a control door that controls at least one inlet air stream, a mode door that controls at least one outlet air stream, and air passages for supplying air through said mixing unit. An air duct system is attached to the control door and directs air from one side of said mixing unit to the other.

This arrangement has an advantage in that the air duct system attached to the control door can be moved together with the control door so that at least one inlet air stream will not be blocked by the air duct system when the control door provides an undisturbed stream of the at least one inlet stream. In this embodiment, the air duct system may be attached to the back of the control door, which is downstream from the source of the at least one inlet air stream. The air duct system further may be attached to the control door in such a manner that the air duct system moves together with the control door while controlling the inflow of at least one inlet air stream.

The air duct system can be attached at the control door by various connections. In a preferred embodiment, the air duct system is attached at the control door by a screw connection. The attachment also can be welded or heat staked to the air duct system.

In another preferred embodiment, the air duct system is a non-releasable injection molded piece that is attached to the control door.

In a further embodiment, the air duct system comprises approximately parallel layered air ducts provided by air chutes that divide at least one substream of at least one inlet air stream into secondary layered substreams that pass through the air chutes of the air duct system.

In yet another embodiment, the air duct system includes approximately parallel layered air ducts comprising alternating layered first and second air ducts that are arranged to feed first and second layers of different temperature air to promote mixing. A first air duct provides a channel for air streaming in a first direction and a second air duct provides a channel for air streaming in a second direction, which second direction may be opposite to the first direction or at any suitable angle that promotes mixing of the air streams. The air duct system may be further arranged in such a manner that hot air streams through the first air ducts and cold air streams through the second air ducts.

In yet a further preferred embodiment, a movable control door is arranged to control two different temperature inlet air streams, preferably a hot inlet air stream and a cold inlet air stream. For that purpose, the control door may be disposed at first and second inlet openings. The control door itself may be rotated into various positions such that a predetermined portion of a cross-section of the first and second inlet openings can be blocked.

A single control door thus permits regulation of the hot and cold air streams by closing or opening predetermined portions of the cross-sections of the inlet openings.

An air mixing unit in an air conditioner for heating or cooling air by mixing air streams is provided. A control door establishes a desirable ratio of two different temperature inlet air streams, and a mixing of the air streams is provided inside the unit with the mixture exiting the unit through mode doors in various modes adjustable by an user.

Further objects, features and advantages of the invention will become apparent from the detailed description of the preferred embodiments that follows, when considered in conjunction with the attached figures of drawing.

BRIEF DESCRIPTION OF THE DRAWINGS

Exemplary embodiments of the invention are given below with reference to the drawings, in which:

d. FIGS. 4a, 4b, 4c, 4d and 4e are illustrations of various positions of an air duct system movable together with a temperature control door for various mixing ratios according to an embodiment of the present invention.

DETAILED DESCRIPTION OF PREFERRED EMBODIMENTS

Figure 1:
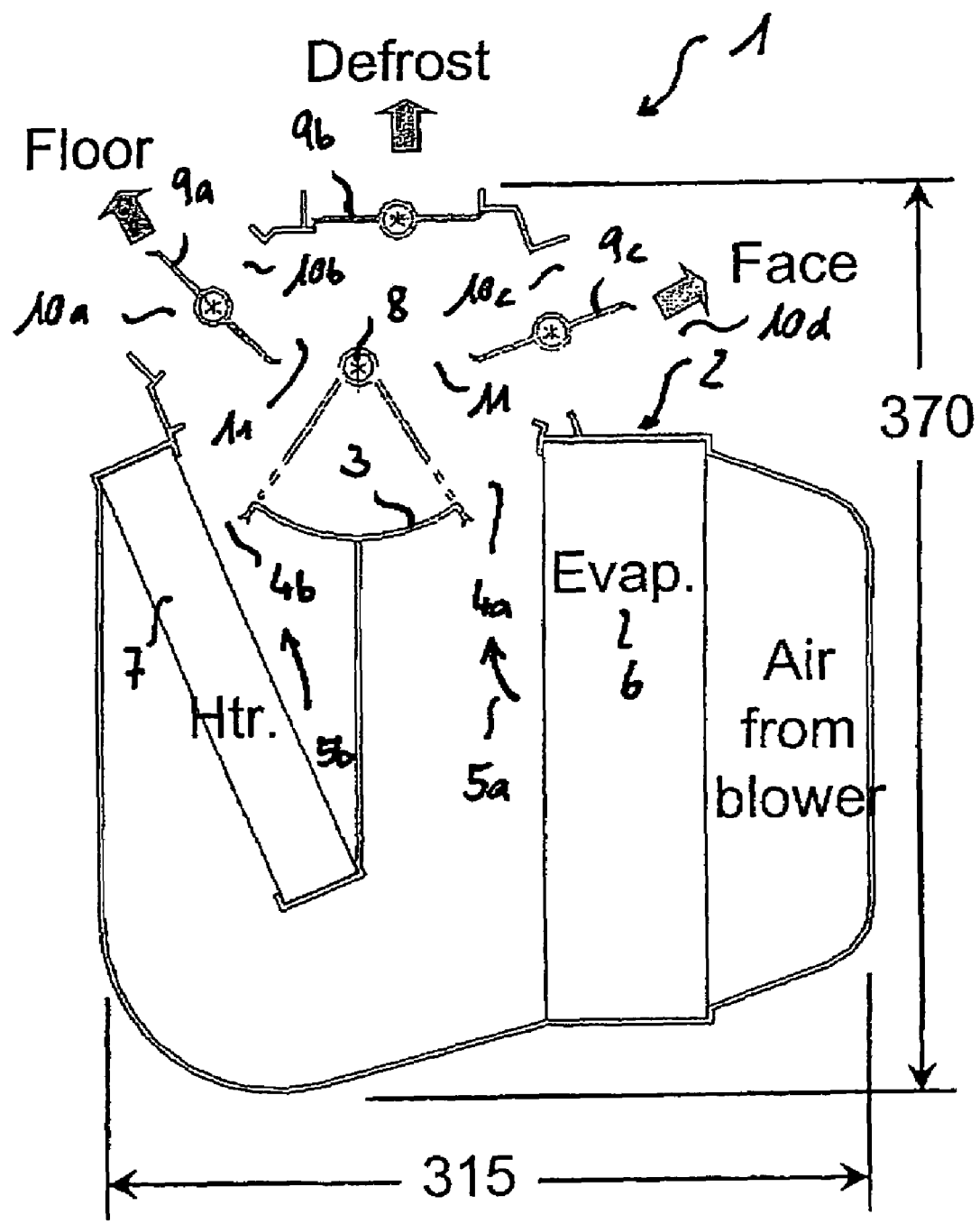
FIG. 1 is an illustration of a conventional ventilation unit showing a mixing of hot and cold air flows.

FIG. 1 shows a ventilation unit 1 for use in heating and/or cooling the interior of a motor vehicle in cross-section.

The ventilation unit 1 comprises an air mixing unit with a housing 2 providing a first inlet opening 4a for cold inlet air and a second inlet opening 4b for hot inlet air. The housing comprises a temperature control door 3 to control a cold inlet air stream 5a and a hot inlet air stream 5b both of which pass through the housing 2. As illustrated, the cold inlet air stream 5a passes through an evaporator 6 and the hot inlet air stream 5b passes through a heater 7.

The temperature control door 3 is rotatably mounted on bearings 8 in the housing 2, and is arranged to regulate a mixing ratio of cold and hot air. As control door 3 rotates in various positions, a predetermined portion of a cross-section of the first and second inlet openings (4a and 4b) can be blocked.

The housing 2 further comprises movable mode doors 9a, 9b, and 9c arranged at outlet openings 10a, 10b, 10c, 10d, where a mixture of hot and cold air exit the housing 2 in various modes that a user may adjust.

In a manner known to those of skill in the art, doors, flaps, baffles and parallel layered panels (not shown), are attached to the housing 2, and are arranged to build up air passages 11 for supplying air through the air mixing unit. The cold and hot air streams (5a and 5b) are canalized and divided in layered substreams by passing the doors, flaps, baffles and panels to promote mixing.

FIG. 1 is illustrative of a simplified system. In the prior art, however, additional doors, flaps, baffles and panels are disposed inside the housings to accomplish desired air mixing characteristics, thereby resulting in undesirably large housings The present invention addresses this problem as is discussed in detail below in conjunction with preferred embodiments.

Figure 2:
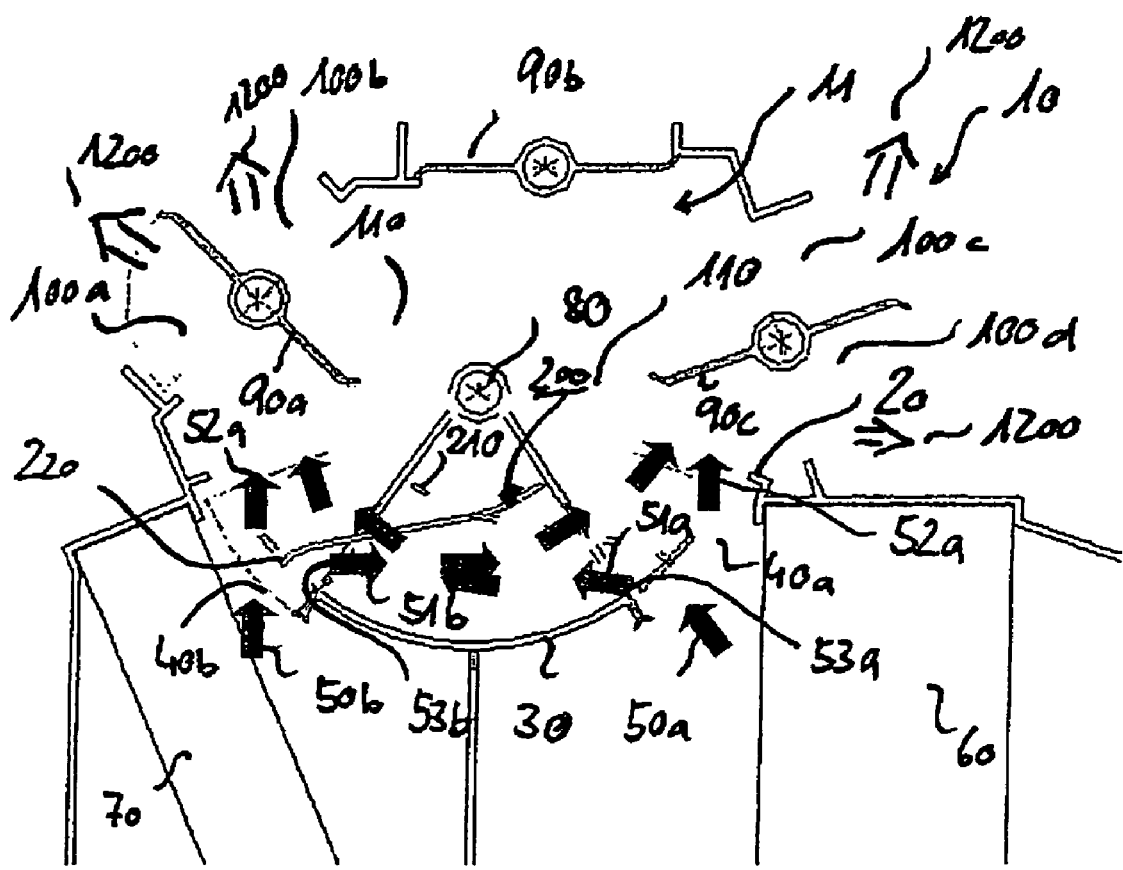
FIG. 2 is an illustration of a ventilation unit according to an embodiment of the present invention.

FIG. 2 shows a preferred embodiment of a ventilation unit of the present invention in cross-section.

An air flow 50a passes through an evaporator 60, which air flow for present purposes is referred to as "cold" air. It will be understood that the term "cold" is relative to air that has not passed through an evaporator. Another air flow 50b passes through a heater core 70, which air flow for the present purposes is referred to as "hot" air. It will be understood that the term "hot" is relative to air that has not been passed through a heater core.

The ventilation unit comprises an air mixing unit 11 with a housing 20 providing a first inlet opening 40a for the cold air stream and a second inlet opening 40b for the hot air stream.

The housing 20, in turn, comprises a temperature control door 30 that controls the cold air stream 50a in the housing 20 through a first inlet opening 40a as well as the hot air stream 50b in the housing 20 through a second inlet opening 40b.

In the embodiment of FIG. 2, the temperature control door 30 is preferably mounted on bearings 80 in the housing 20 and is arranged to regulate a mixing ratio of the cold and hot air streams (50a and 50b) by rotation through various positions. As control door 30 rotates, a predetermined portion of a cross-section of the first and second inlet openings (40a and 40b) is opened or blocked.

Figure 4B:
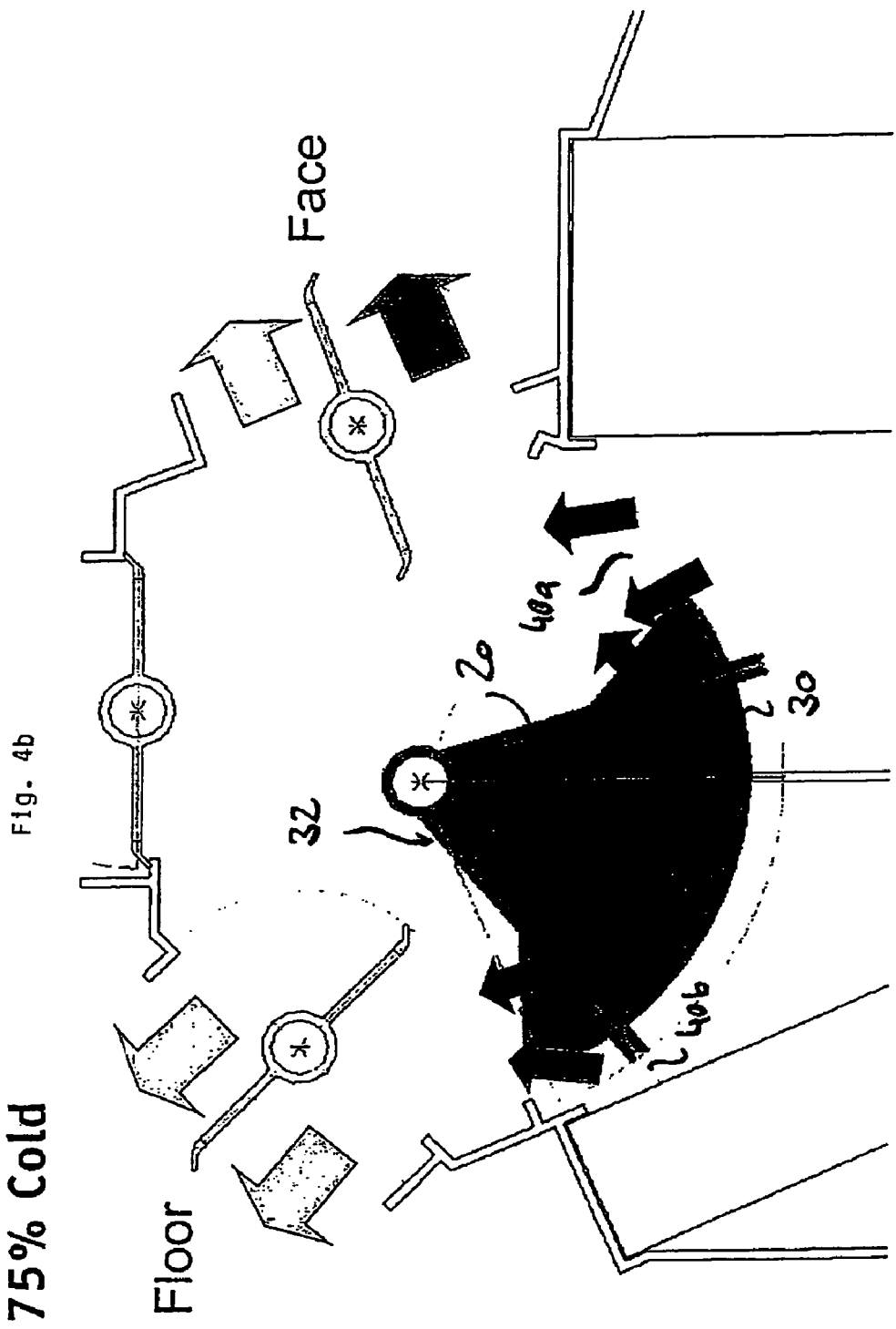
Figure 4D:
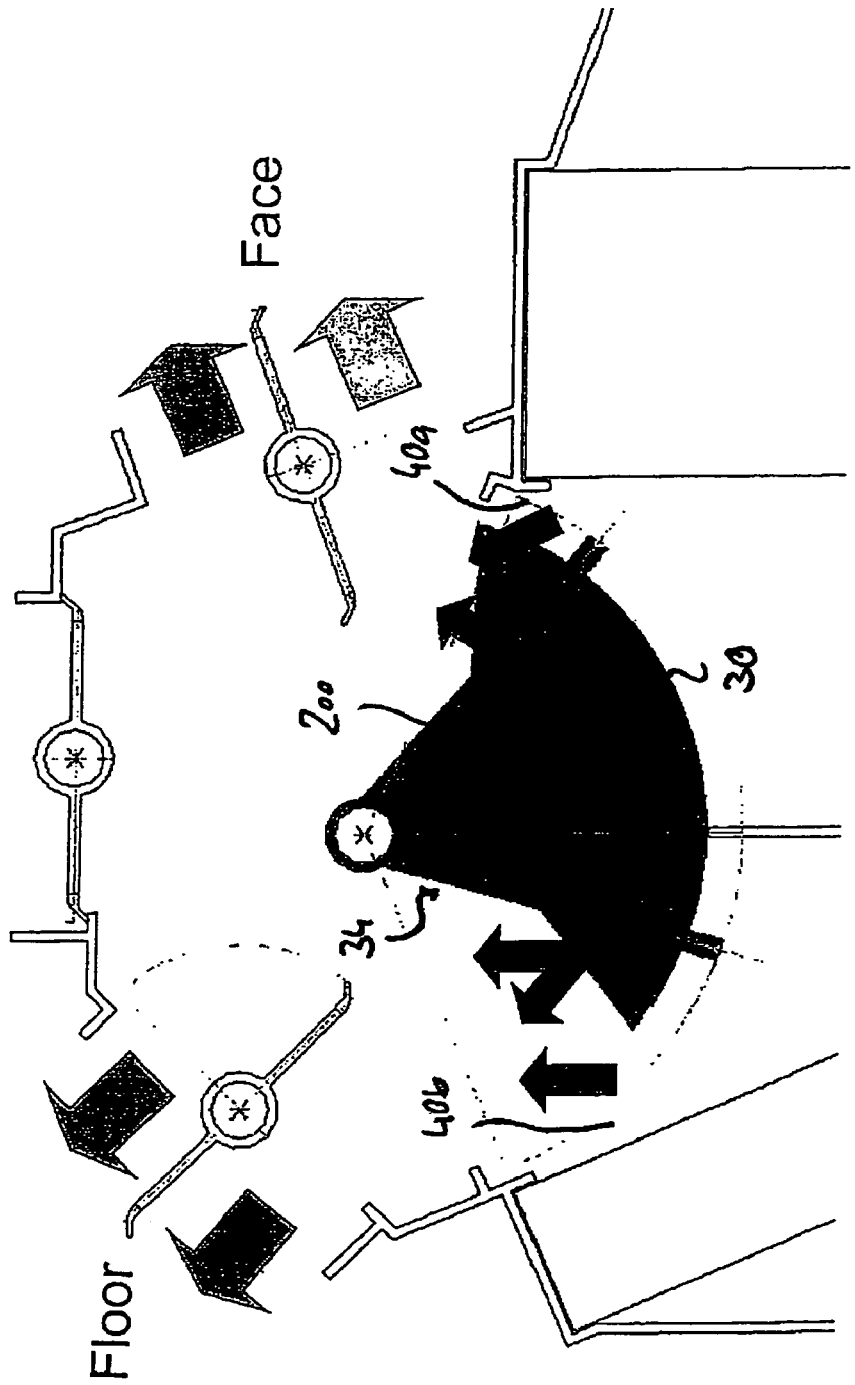

FIGS. 4a to e show five different positions (31 to 35) of the temperature control door 30 relating to five corresponding mixing ratios of cold and hot air. FIG. 4a illustrates a full cold mix (100% cold–0% hot); FIG. 4b illustrates a 75% cold mix (75% cold–25% hot); FIG. 4c illustrates a 50—50 mix (50% cold–50% hot); FIG. 4c illustrates a 75% hot mix (25% cold–75% hot); and FIG. 4e illustrates a full hot mix (0% cold–100% hot).

The housing 20 of the air mixing unit according to the present invention further comprises air passages 110 built by doors, flaps, baffles and parallel layered panels (not shown) for supplying hot and cold air flows to outlet openings 100, from which air enters the interior of the motor vehicle.

Movable mode doors 90a, 90b, and 90c are disposed at outlet openings 100a, 100b, 100c, and 100d, where the mixture of hot and cold air 1200 exits the housing 20 in various modes that a user may adjust.

Figure 3A:
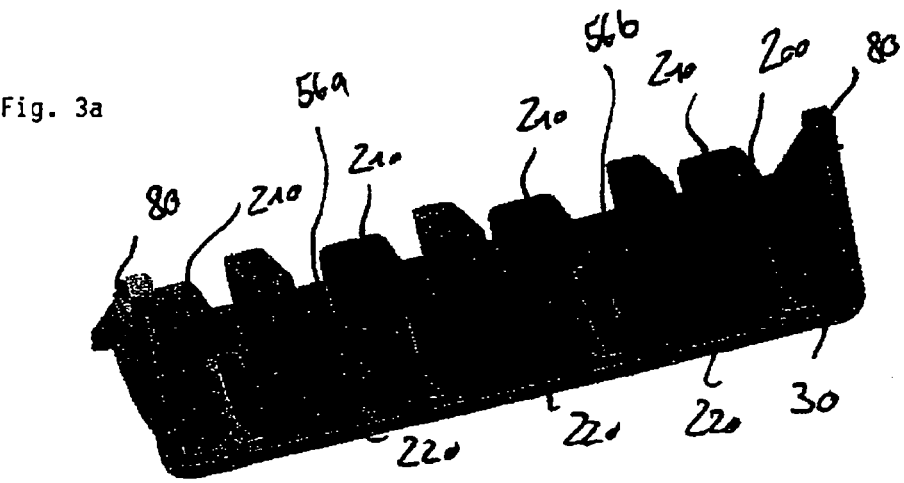
FIGS. 3a, 3b and 3c are illustrations of various perspective views of an air duct system according to an embodiment of the present invention.
Figure 3B:
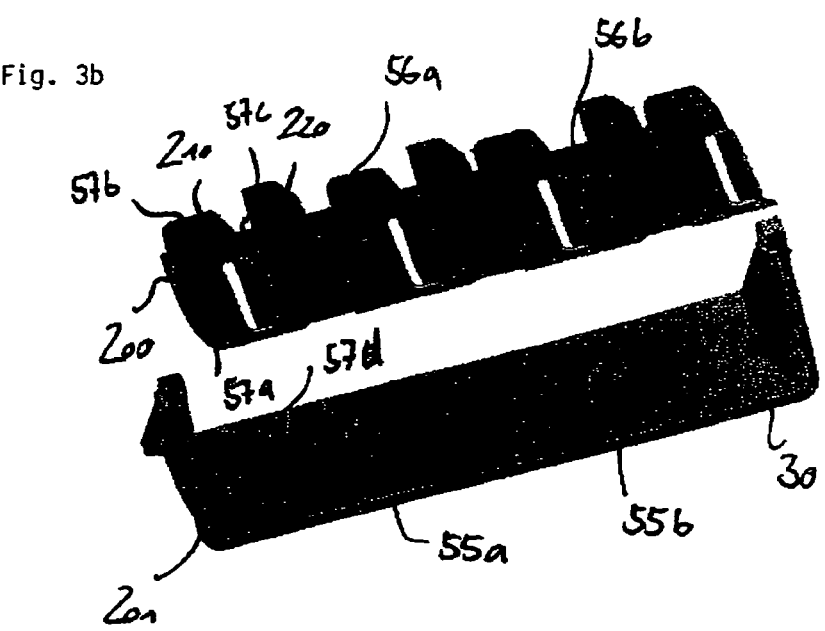
Figure 3C:
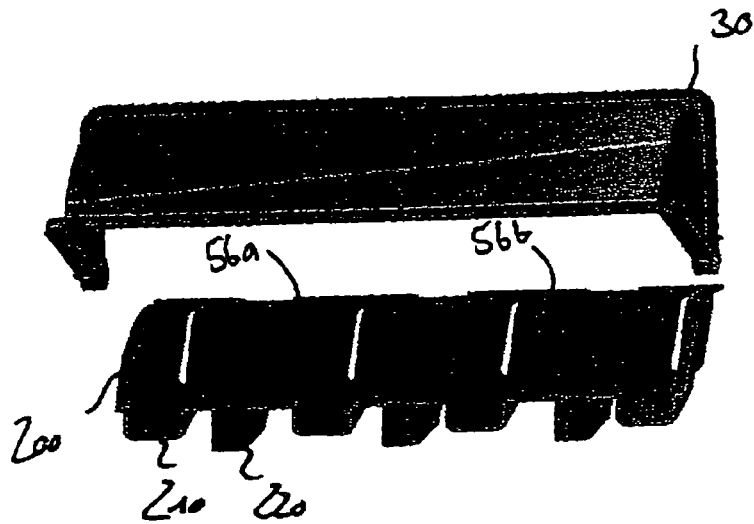

With reference to FIGS. 2 and 4a to 4e, it is seen that hot and cold air flows 50a, 50b mix prior to exit the outlet openings 100a to 100d. According to this embodiment of the present invention, an air duct system 200 (as illustrated in FIGS. 3a, 3b, and 3c) enhances the efficiency of the mixing process of hot and cold air flows. This system 200 is disposed in the housing 20 and is attached at a backward side 201 of the temperature control door 30. Temperature control door 30 is connected to the air duct system 200 in such a manner that both can be turned together.

In this embodiment, air duct system 200 comprises alternating layered first air ducts 210 and second air ducts 220, which are arranged in approximately parallel layered air chutes. Cold air flows through first air ducts 210 whereas hot air flows through second air ducts 220.

The first and second air ducts (210 and 220) are arranged in such a manner, that the cold air streams 56a flow through the first air ducts 210 in a substantially opposite direction from the hot air streams 56b flowing through the second air ducts 220. It is noted, however, that the angle of one air flow relative to the other may be adjusted depending on the desired mixing characteristics.

This disposition of air ducts promotes the mixing of cold and hot air by funneling air from one side of the air mixing unit 11 to the other thereby feeding layers of opposite temperature air to blend into the air stream.

When the cold air stream 50a enters the housing 20 through the first inlet opening 40a and passes the temperature control door 30, it is divided into substreams in which a first substream 52a flows in a non-deflected direction and a second substream 53a is deflected in a different direction.

The second substream 53a is deflected approximately 90° and divided into yet additional substreams, which together comprise cold air flow 51a. By flowing through the first air duct 210, the cold air streams 51a are funneled from the one side of the mixing unit to the other (as illustrated in the FIG. 2, for example). By exiting the air duct system 200 the cold air streams 51a are feeding layers of different temperature air to blend into the hot air 52b.

The streaming of the hot air 50b entering the housing 20 through the second inlet opening 40b is substantially laterally reversed. After passing the temperature control door 30, the hot air stream 50b is divided into substreams in which a first substream 52b flows in a non-deflected direction and a second substream 53b is deflected in a different direction.

This second substream 53b is deflected approximately 90° and divided into yet additional secondary substreams, which together comprise hot air flow 51b, flowing through the second air ducts 220. By flowing through the second air duct 220 the hot air streams 51b are funneled from one side of the mixing unit to the other (as illustrated in FIG. 2, for example). By exiting the air duct system 200 the hot air streams 51b are feeding layers of different temperature air to blend into the cold air 52a.

As illustrated in FIGS. 3a to 3c, the air duct system 200 of a preferred embodiment is an injection molded piece attached to the control door 30 by screw connection. Two pins (55a and 55b) are disposed inside structure 201 in two corresponding recesses (56a and 56b) and are further disposed to center the connection.

Also as seen in FIGS. 3a to 3c, the first and second air ducts (210 and 220) are slightly curved in order to align with the shape of temperature control door 30. Three walls 57a, 57b, and 57c are formed within the air duct system 200 itself; a fourth wall 57d is established within the temperature control door 30 connected with the air duct system 200.

FIG. 2 and FIGS. 4a to 4e show the connected combination of the air duct system 200 and the temperature control door 30 in cross-section. Seen in cross-section, the combination is formed approximately like a sector of a circle rotatably mounted on bearings 80 in the middle of a circle. The mixing ratio of cold and hot air is regulated by rotating the combination along the circumference.

Regulation of a mixing ratio is thus accomplished with a single door, the temperature control door 300, which results from the rotation of the temperature control door at the inlet openings 40a, 40b.

Although the present invention has been described and illustrated with reference to one preferred embodiment, it would be understood that this has been undertaken by way of illustration and is not to be taken by way of limitation. The spirit and scope of the present invention are limited only by the terms of the appended claims.

What we claim is:

1. An air mixing unit for a ventilation system, comprising a housing with a control door to control at least one inlet air stream, a mode door to control at least one outlet air stream, air passages for supplying air through said mixing unit and an air duct system to funnel air in a lateral direction from one side of said mixing unit to the other, wherein said air duct system is coupled to and downstream of said control door.

2. The air mixing unit according to claim 1, wherein said air duct system is integrally formed to the back of said control door.

3. The air mixing unit according to claim 1, wherein said air duct system is attached to said control door in such a manner that said air duct system moves together with said control door while controlling said at least one inlet air stream.

4. The air mixing unit according to claim 1, wherein said air duct system is attached at said control door by screw connection.

5. The air mixing unit according to claim 1, wherein said air duct system is injection molded and non-releaseably attached to said control door.

6. The air mixing unit according to claim 1, wherein said air duct system comprises air ducts arranged to divide at least one substream of said at least one inlet air stream into secondary layered substream streaming through said air ducts of said air duct system.

7. An air mixing unit for a ventilation system, comprising a housing with a control door to control at least one inlet air stream, a mode door to control at least one outlet air stream, air passages for supplying air through said mixing unit and an air duct system, attached to said control door, comprised of alternating layered first and second air ducts arranged to feed first and second layers of different temperature air into said air.

8. The air mixing unit according to claim 7, wherein said first and second air ducts are arranged in such a manner that air passing through said first air ducts stream in an approximately opposite direction to air passing through said second air ducts.

9. The air mixing unit according to claim 7, wherein said first and second air ducts comprise substantially parallel alternating layered air chutes.

10. The air mixing unit according to claim 7, wherein hot air streams through said first air ducts and cold air streams through said second air ducts.

11. The air mixing unit according to claim 1, wherein said control door controls two inlet air streams of different temperatures.

12. The air mixing unit according to claim 11, wherein said control door regulates a mixing ratio of said two different temperature inlet air streams.

13. The air mixing unit according to claim 11, wherein said two different temperature inlet air steams are a cold air stream and a hot air stream.

14. The air mixing unit according to claim 1, used in an air conditioner for heating or cooling air by mixing air streams.

15. A method for mixing air in a ventilation system comprising:
    directing a first stream of air of a first temperature into a housing at a first inlet;
    directing a second stream of air of a second temperature which is different than the first temperature into the housing at a second inlet; and
    converging the first and second air streams within the housing at an opening governed by a rotatable control door that Includes an attached integral air duct, wherein the angle of rotation of the control door causes the air duct system to deflect a predetermined amount of the first air stream toward the second inlet and a predetermined amount of the second air stream toward the first inlet.

16. An air mixing unit in a ventilation system comprising a first inlet for a first stream of air, a second inlet for a second stream of air, an outlet, and a channel situated between the inlets and outlet wherein the movement of air through the channel is governed by a rotatable control door and an integral air duct attached to the control door such that the control door's angle of rotation causes a predetermined amount of air from the first inlet to pass in a lateral direction through the air duct toward the second inlet and a predetermined amount of air from the second inlet to pass in a lateral direction through the air duct toward the first inlet.

* * * * *